US012194474B2

(12) United States Patent
Peng et al.

(10) Patent No.: US 12,194,474 B2
(45) Date of Patent: Jan. 14, 2025

(54) ADJUSTMENT-FACILITATING VIBRATING MILL

(71) Applicant: Changsha Mitr Instrument Equipment Co., Ltd, Changsha (CN)

(72) Inventors: Weicai Peng, Changsha (CN); Yuqi Peng, Changsha (CN); Weiguo Peng, Changsha (CN); Weifeng Peng, Changsha (CN)

(73) Assignee: Changsha Mitr Instrument Equipment Co., Ltd, Changsha (CN)

( * ) Notice: Subject to any disclaimer, the term of this patent is extended or adjusted under 35 U.S.C. 154(b) by 326 days.

(21) Appl. No.: 17/971,664

(22) Filed: Oct. 24, 2022

(65) Prior Publication Data

US 2024/0024887 A1 Jan. 25, 2024

(30) Foreign Application Priority Data

Jul. 25, 2022 (CN) ........................ 202210878823.9

(51) Int. Cl.
*B02C 19/16* (2006.01)
*B02C 17/14* (2006.01)

(52) U.S. Cl.
CPC .............. *B02C 19/16* (2013.01); *B02C 17/14* (2013.01)

(58) Field of Classification Search
CPC ................................ B02C 17/14; B02C 19/16
See application file for complete search history.

(56) References Cited

U.S. PATENT DOCUMENTS 2,468,515 A * 4/1949 Robinson ................ B02C 17/14 451/328
2,818,220 A * 12/1957 Woody .................... B02C 17/14 241/153
2,822,987 A * 2/1958 Uhle ....................... B02C 17/14 241/172

(Continued)

FOREIGN PATENT DOCUMENTS

AU 8288682 A * 5/1983 ............. B02C 19/16
CN 201357094 Y * 12/2009

(Continued)

*Primary Examiner* — Faye Francis
(74) *Attorney, Agent, or Firm* — Bayramoglu Law Offices LLC

(57) ABSTRACT

An adjustment-facilitating vibrating mill includes a base, a grinding cylinder, and a vibrating motor. An elastic mechanism is arranged on the base. The grinding cylinder is fixedly connected to the elastic mechanism. The vibrating motor is arranged on the grinding cylinder. Two sides of the vibrating motor are provided with eccentric mechanisms; each eccentric mechanism includes a fixed eccentric block, an adjustment motor, and an adjustable eccentric block. The fixed eccentric block sleeves an output shaft of the vibrating motor. The adjustment motor is connected to the fixed eccentric block through a mounting seat. The adjustable eccentric block is connected to the adjustment motor through a transmission mechanism. According to the vibrating mill, an included angle between the adjustable eccentric block and the fixed eccentric block is adjusted using the adjustment motor and the transmission mechanism, so that an exciting force can be adjusted without removing the vibrating motor.

9 Claims, 4 Drawing Sheets

(56) References Cited

U.S. PATENT DOCUMENTS

| | | | | | |
|---|---|---|---|---|---|
| 3,212,722 | A * | 10/1965 | Heinz-Jochen | B02C 17/14 241/153 |
| 3,268,177 | A * | 8/1966 | McKibben | B02C 19/16 366/128 |
| 3,272,443 | A * | 9/1966 | Reiners | B02C 19/16 241/137 |
| 3,295,771 | A * | 1/1967 | Maeder | B02C 17/14 241/153 |
| 3,645,458 | A * | 2/1972 | Tobe | B02C 17/14 366/209 |
| 3,995,781 | A * | 12/1976 | Nette | B02C 17/14 241/164 |
| 4,625,921 | A * | 12/1986 | Blundell | B02C 17/14 241/284 |
| 5,318,228 | A * | 6/1994 | Macas | B02C 17/20 241/21 |
| 5,513,809 | A * | 5/1996 | Perkel | B02C 19/186 241/67 |
| 2003/0025018 | A1 * | 2/2003 | Mashburn | G01N 1/286 241/175 |
| 2012/0280069 | A1 * | 11/2012 | Pike, Sr. | B02C 17/14 241/170 |

FOREIGN PATENT DOCUMENTS

| | | | | |
|---|---|---|---|---|
| CN | 101804379 | A * | 8/2010 | |
| CN | 101869862 | A * | 10/2010 | |
| CN | 201613165 | U * | 10/2010 | |
| CN | 201848278 | U * | 6/2011 | |
| CN | 104475212 | A * | 4/2015 | B02C 19/16 |
| CN | 205734381 | U * | 11/2016 | |
| CN | 112517162 | A * | 3/2021 | B02C 17/10 |
| DE | 4335797 | A1 * | 4/1995 | B02C 17/14 |

* cited by examiner

ADJUSTMENT-FACILITATING VIBRATING MILL

CROSS REFERENCE TO THE RELATED APPLICATIONS

This application is based upon and claims priority to Chinese Patent Application No. 202210878823.9, filed on Jul. 25, 2022, the entire contents of which are incorporated herein by reference.

TECHNICAL FIELD

The present invention relates to the technical field of powder milling equipment, and specifically to an adjustment-facilitating vibrating mill.

BACKGROUND

In an experiment or production process, before powder enters a next process as an additive or a main material, the powder needs to undergo multiple processes, such as pre-crushing, grinding, screening, mixing, sampling, tablet molding, and sintering. Any one of the foregoing processes has relatively high process requirements, such as purity, fineness, forming degree, cladding, and hardness. In the grinding process, a vibrating mill is frequently used, which pulverizes or grinds a solid material using mechanical oscillating force to obtain ultra-fine powder particles. However, the vibrating mills in the prior art have a relatively single oscillating effect, which cannot meet such a situation that the amplitude or an exciting force needs to be adjusted. A few of the vibrating mills can adjust the amplitude or the exciting force, but they are inconvenient to adjust. The exciting force can only be adjusted after removing a vibrating motor and manually adjusting an eccentric block, which brings a great inconvenience to users. Therefore, it is urgent to design an adjustment-facilitating vibrating mill.

SUMMARY

The present invention mainly aims to provide an adjustment-facilitating vibrating mill, so as to solve the problems in the existing art.

In order to solve the above technical problem, the present invention adopts the following technical solution:

An adjustment-facilitating vibrating mill is provided, including a grinding cylinder, and a vibrating motor, wherein an elastic mechanism is arranged on the base; the grinding cylinder is fixedly connected to the elastic mechanism; the vibrating motor is arranged on the grinding cylinder; two sides of the vibrating motor are provided with eccentric mechanisms; each eccentric mechanism includes a fixed eccentric block, an adjustment motor, and an adjustable eccentric block; the fixed eccentric block sleeves an output shaft of the vibrating motor; the adjustment motor is connected to the fixed eccentric block through a mounting seat; and the adjustable eccentric block is connected to the adjustment motor through a transmission mechanism.

Further, the transmission mechanism includes a transmission rod and a transmission gear; the transmission rod is connected to the adjustment motor through a coupler; the transmission gear is engaged with the transmission rod; a connecting shaft is arranged on the adjustable eccentric block in a penetrating manner; and the connecting shaft is connected to an inner hole of the transmission gear.

Further, one side of the adjustable eccentric block close to the transmission rod is provided with a groove, and the transmission gear is located in the groove.

Further, a sliding chute is formed inside the adjustable eccentric block; one end of the sliding chute close to a circle center of the adjustable eccentric block is provided with a first spring, and the other end of the first spring is provided with a balance weight ball.

Further, a top of the grinding cylinder is provided with a feed pipe, and a bottom is provided with a discharge pipe; a screen is arranged at an outlet of the discharge pipe; an industrial camera is arranged on an inner wall of the discharge pipe; a controller is arranged on the base; and the industrial camera and the adjustment motor are both electrically connected to the controller.

Further, the elastic mechanism includes a rubber spring, a lower supporting pillar, and an upper supporting pillar; the lower supporting pillar is fixedly arranged at a top of the base; the upper supporting pillar is fixedly arranged on a connecting plate on a side portion of the grinding cylinder; and two ends of the rubber spring respectively sleeve the lower supporting pillar and the upper supporting pillar.

Further, the upper supporting pillar and the lower supporting pillar are in one-to-one correspondence, and a bottom of the upper supporting pillar is provided with a round hole matched with the lower supporting pillar.

Further, a sound-proof housing is arranged on the base; and the grinding cylinder and the vibrating motor are both located inside the sound-proof housing.

Further, a protection cover is arranged on an outer side of the eccentric mechanism; and the protection cover is mounted on the vibrating motor through a fixing screw.

Compared with the prior art, the present invention has the following beneficial effects: An included angle between the adjustable eccentric block and the fixed eccentric block is adjusted using the adjustment motor and the transmission mechanism, so that an exciting force can be adjusted without removing the vibrating motor and does not need to be adjusted manually by a user. The adjustment efficiency is improved. Effects of saving the labor and facilitating the adjustment and use are achieved.

1—base, 2—grinding cylinder, 21—feed pipe, 22—discharge pipe, 3—vibrating motor, 4—elastic mechanism, 5—protection cover, 6—eccentric mechanism, 61—fixed eccentric block, 62—adjustment motor, 63—adjustable eccentric block, 7—transmission rod, 8—transmission gear, 9—groove, 10—sliding chute, 11—first spring, 12—balance weight ball, 13—connecting plate, 14—connecting shaft, 15—mounting seat, 16—rubber spring, and 17—lower supporting pillar.

DETAILED DESCRIPTION OF THE EMBODIMENTS

The technical solution of the present invention is further explained below by accompanying drawings and the embodiments.

Figure 1:
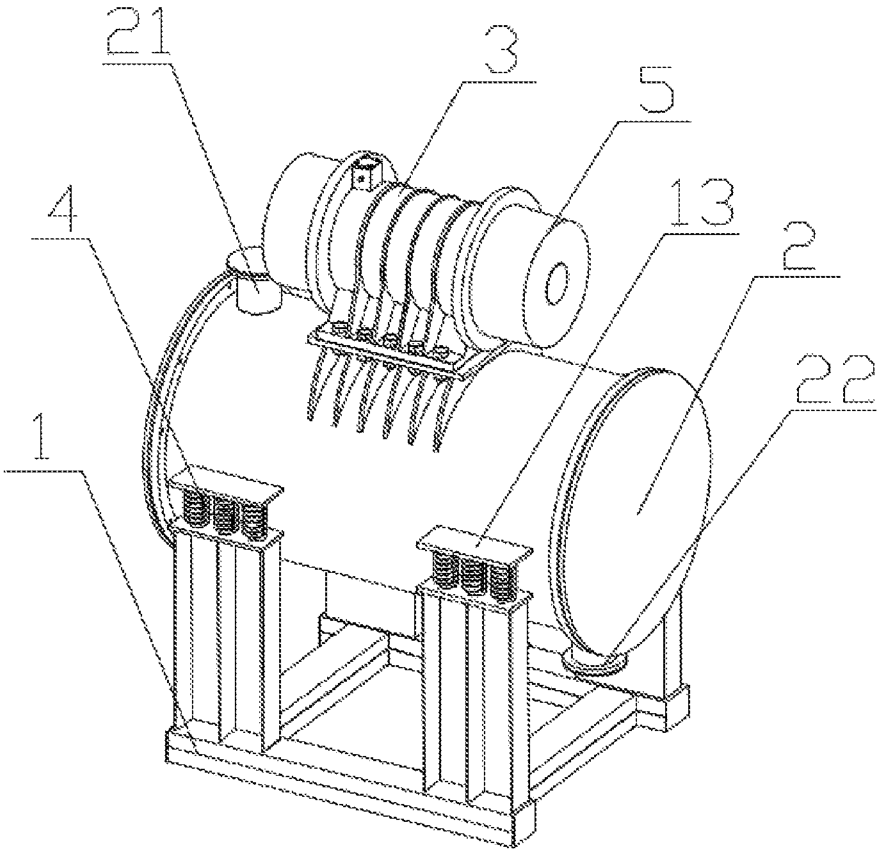
FIG. 1 is a schematic diagram of an overall structure of the present invention.
Figure 2:
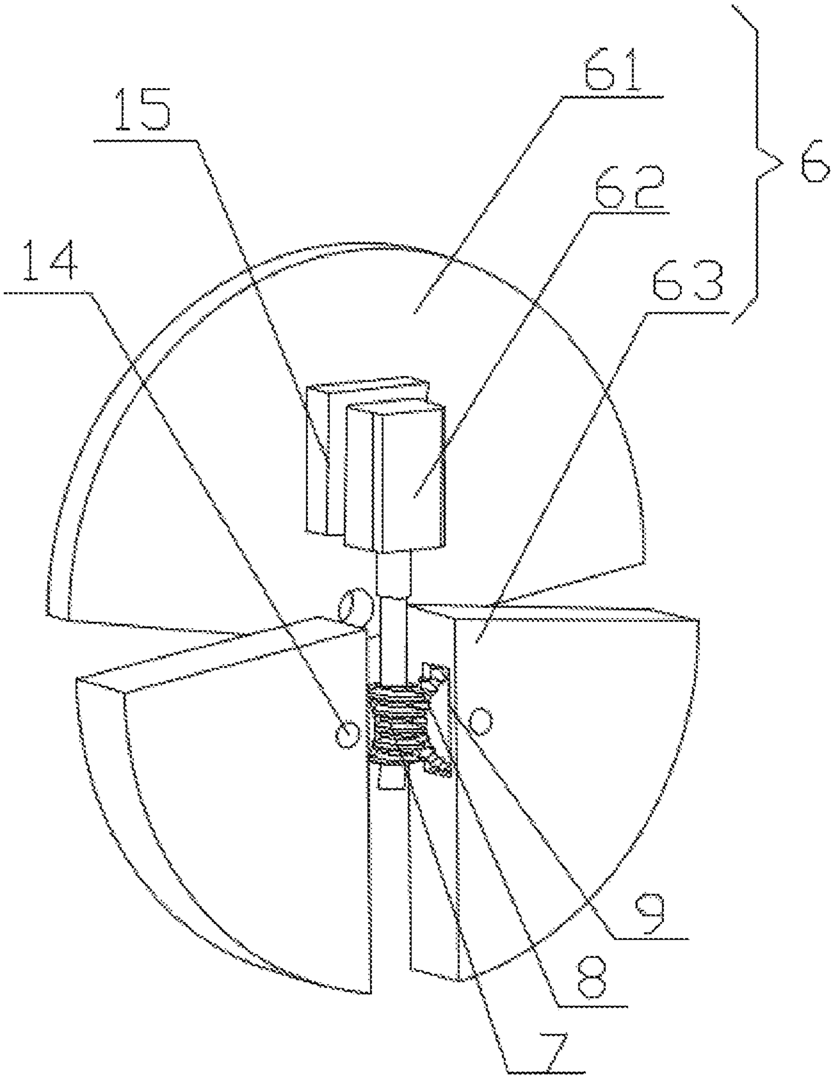
FIG. 2 is a schematic structural diagram of an eccentric mechanism according to the present invention.
Figure 3:
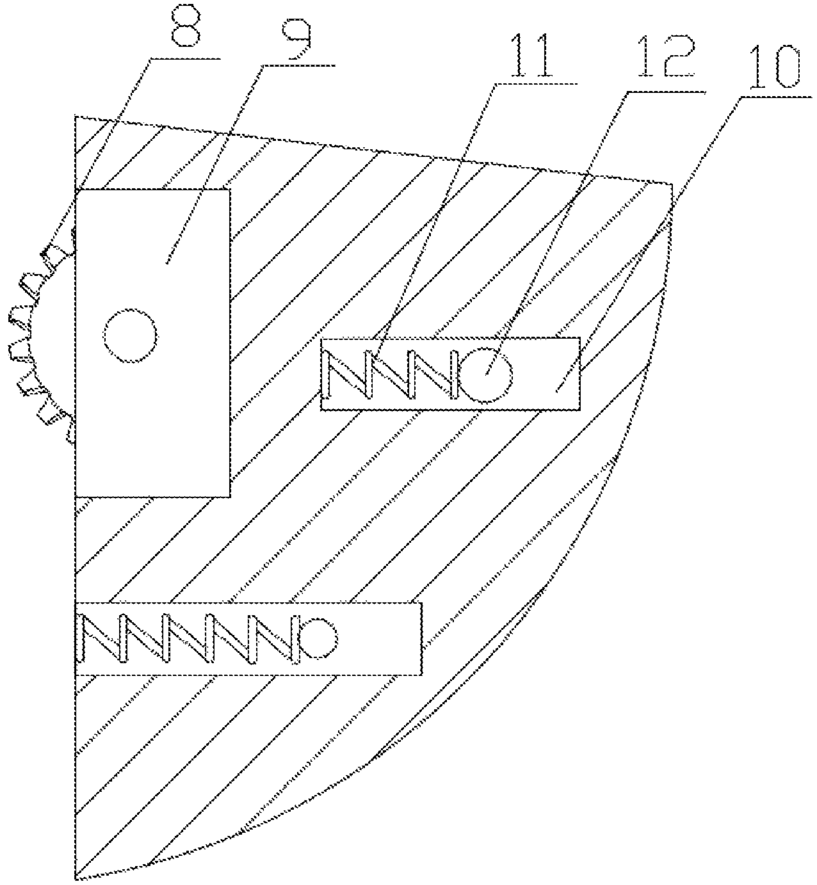
FIG. 3 is a schematic diagram of an internal structure of an adjustable eccentric block according to the present invention.
Figure 4:
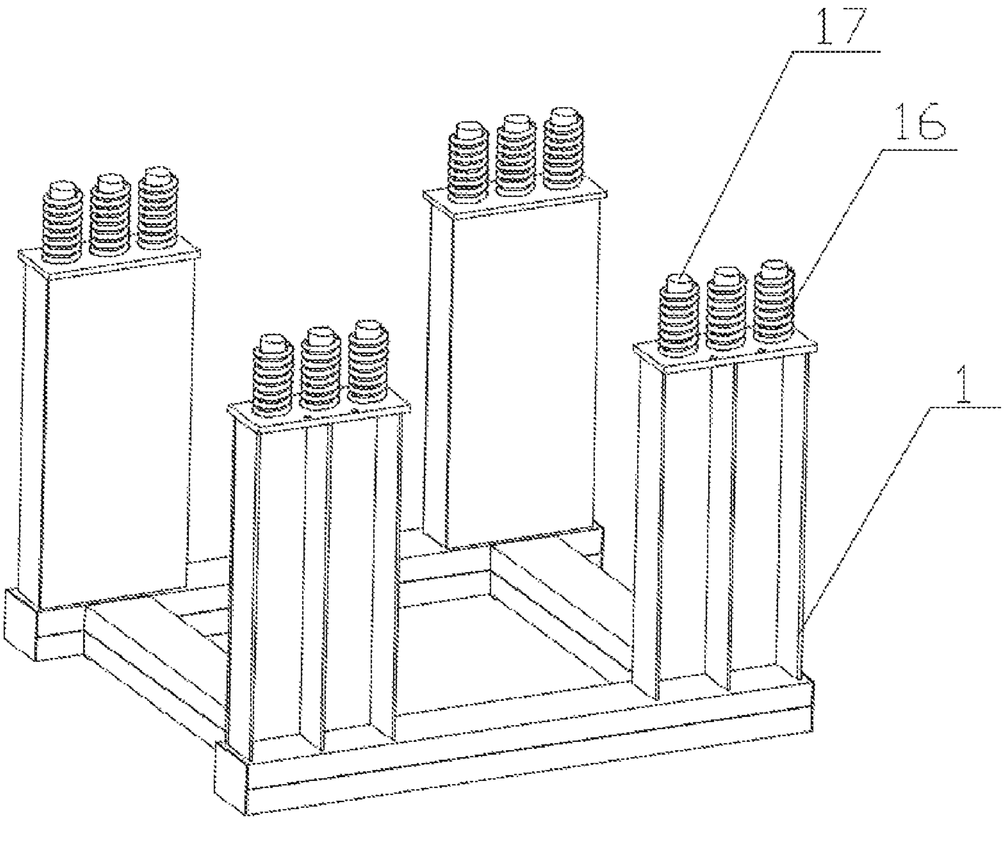
FIG. 4 is a schematic overall structural diagram of a base and an elastic mechanism according to the present invention.

Referring to FIG. 1 to FIG. 4, the present invention provides an adjustment-facilitating vibrating mill, including a base 1, a grinding cylinder 2, and a vibrating motor 3, wherein an elastic mechanism 4 is arranged on the base 1; the grinding cylinder 2 is fixedly connected to the elastic mechanism 4; the vibrating motor 3 is arranged on the grinding cylinder 2; two sides of the vibrating motor 3 are provided with eccentric mechanisms 6; each eccentric mechanism 6 includes a fixed eccentric block 61, an adjustment motor 62, and an adjustable eccentric block 63; the fixed eccentric block 61 sleeves an output shaft of the vibrating motor 3; the adjustment motor 62 is connected to the fixed eccentric block 61 through a mounting seat 15; and the adjustable eccentric block 63 is connected to the adjustment motor 62 through a transmission mechanism. In this embodiment, the transmission mechanism includes a transmission rod 7 and a transmission gear 8; the transmission rod 7 is connected to the adjustment motor 62 through a coupler; the transmission gear 8 is engaged with the transmission rod 7; a connecting shaft 14 is arranged on the adjustable eccentric block 63 in a penetrating manner; and the connecting shaft 14 is connected to an inner hole of the transmission gear 8. During use, the adjustment motor 62 drives the transmission rod 7 to move, and the transmission rod 7 drives the transmission gear 8 engaged with the transmission rod to rotate. The transmission gear 8 thus drives the adjustable eccentric block 63 to move to finally adjust an included angle between the adjustable eccentric block 63 and the fixed eccentric block 61. When the two eccentric blocks overlap, the exciting force is maximum. When the two eccentric blocks form a circle, the exciting force is minimum. The included angle between the adjustable eccentric block 63 and the fixed eccentric block 61 is adjusted using the adjustment motor 62 and the transmission mechanism, so that the exciting force can be adjusted without removing the vibrating motor and does not need to be adjusted manually by a user. The adjustment efficiency is improved. Effects of saving the labor and facilitating the adjustment and use are achieved. In this embodiment, a grinding medium made of a high-temperature-resistant material, i.e. zirconia, or a high-temperature-resistant antiwear hard alloy material is arranged in the grinding cylinder 2. The grinding medium may be spherical or rodlike.

Preferably, one side of the adjustable eccentric block 63 close to the transmission rod 7 is provided with a groove 9, and the transmission gear 8 is located in the groove 9. The groove 9 can protect the transmission gear 8.

Preferably, a sliding chute 10 is formed inside the adjustable eccentric block 63; one end of the sliding chute 10 close to a circle center of the adjustable eccentric block 63 is provided with a first spring 11, and the other end of the first spring 11 is provided with a balance weight ball 12. After the adjustment of the included angle between the adjustable eccentric block 63 and the fixed eccentric block 61 is completed, the adjustable eccentric block and the fixed eccentric block rotate with the output shaft of the vibrating motor. At this time, the balance weight ball 12 inside the adjustable eccentric block 63 will pull the first spring 11 to move outwards under the action of a centrifugal force, and the entire balance weight ball 12 skews to the outer side, which increases an eccentric force of the adjustable eccentric block 63. When the rotating speed of the adjustable eccentric block 63 increases, the eccentric force greatly increases compared to that of an eccentric block without the balance weight ball 12, so that an effect of adjusting the exciting force and the amplitude is achieved.

Preferably, a top of the grinding cylinder 2 is provided with a feed pipe 21, and a bottom is provided with a discharge pipe 22; a screen is arranged at an outlet of the discharge pipe 22; an industrial camera is arranged on an inner wall of the discharge pipe 22; a controller is arranged on the base 1; and the industrial camera and the adjustment motor 62 are both electrically connected to the controller. The industrial camera is used for photographing powder particles on the screen.

During use, an appropriate screen can be selected according to a desired size of powder particles. Only powder particles smaller than a mesh can be discharged from the discharge pipe 22, and powder particles larger than the mesh will remain on the screen. When there are many powder particles remaining on the screen, it indicates that the grinding effect at this time is poor, and the amplitude or exciting force needs to be changed. At this time, the industrial camera transmits what it photographs to the controller. The controller may control the adjustment motor 62 to be started to adjust the included angle between the adjustable eccentric block 63 and the fixed eccentric block 61, thus completing the adjustment of the exciting force and the amplitude, and vice versa.

Preferably, the elastic mechanism 4 includes a rubber spring 16, a lower supporting pillar 17, and an upper supporting pillar; the lower supporting pillar 17 is fixedly arranged at a top of the base 1; the upper supporting pillar is fixedly arranged on a connecting plate 14 on a side portion of the grinding cylinder 2; and two ends of the rubber spring 16 respectively sleeve the lower supporting pillar and the upper supporting pillar. The upper supporting pillar and the lower supporting pillar are in one-to-one correspondence, and a bottom of the upper supporting pillar is provided with a round hole matched with the lower supporting pillar. In this embodiment, the lower supporting pillar and the upper supporting pillar can play a role of supporting and positioning when the grinding cylinder 2 is mounted on the base 1, thus facilitating fast mounting. The rubber spring 16 is used as an elastic support between the grinding cylinder 2 and the base 1, so that the structure is simple, and helps to enhance the vibrating effect on the grinding cylinder 2 and can also achieve a certain protection effect on the base. Furthermore, the controller on the base 1 can be protected from being affected by the vibration of the vibrating motor above, and the service life of the mill can be prolonged.

Preferably, a sound-proof housing is arranged on the base 1; and the grinding cylinder 2 and the vibrating motor 3 are both located inside the sound-proof housing. The sound-proof housing can isolate sound and reduce noise.

Preferably, a protection cover 5 is arranged on an outer side of the eccentric mechanism 6; and the protection cover is mounted on the vibrating motor 3 through a fixing screw. The protection cover 5 can protect the eccentric mechanism 6, and can also avoid such a phenomenon that the adjustable eccentric block 63 and the fixed eccentric block 61 are thrown out and injure workers when they fail during working.

The above description is only preferred embodiments of the present invention, and is not intended to limit the technical scope of the present invention. As such, any minor amendments, equivalent changes and modifications made to the above embodiments according to the technical spirit of the present invention shall fall within the scope of the technical solution of the present invention.

What is claimed is:

1. An adjustment-facilitating vibrating mill, comprising a base, a grinding cylinder, and a vibrating motor, wherein an elastic mechanism is arranged on the base; the grinding cylinder is fixedly connected to the elastic mechanism; the vibrating motor is arranged on the grinding cylinder; two sides of the vibrating motor are provided with eccentric mechanisms; each of the eccentric mechanisms comprises a fixed eccentric block, an adjustment motor, and an adjustable eccentric block; wherein the fixed eccentric block sleeves an output shaft of the vibrating motor; the adjustment motor is connected to the fixed eccentric block through a mounting seat; and the adjustable eccentric block is connected to the adjustment motor through a transmission mechanism.

2. The adjustment-facilitating vibrating mill according to claim 1, wherein the transmission mechanism comprises a transmission rod and a transmission gear; wherein the transmission rod is connected to the adjustment motor through a coupler; the transmission gear is engaged with the transmission rod; a connecting shaft is arranged on the adjustable eccentric block in a penetrating manner; and the connecting shaft is connected to an inner hole of the transmission gear.

3. The adjustment-facilitating vibrating mill according to claim 2, wherein a side of the adjustable eccentric block is provided with a groove, wherein the side of the adjustable eccentric block is adjacent to the transmission rod; and the transmission gear is located in the groove.

4. The adjustment-facilitating vibrating mill according to claim 1, wherein a sliding chute is formed inside the adjustable eccentric block; an end of the sliding chute is provided with a first spring, wherein the end of the sliding chute is adjacent to a circle center of the adjustable eccentric block; and the other end of the first spring is provided with a balance weight ball.

5. The adjustment-facilitating vibrating mill according to claim 1, wherein a top of the grinding cylinder is provided with a feed pipe, and a bottom of the grinding cylinder is provided with a discharge pipe; a screen is arranged at an outlet of the discharge pipe; an industrial camera is arranged on an inner wall of the discharge pipe; a controller is arranged on the base; and the industrial camera and the adjustment motor are electrically connected to the controller.

6. The adjustment-facilitating vibrating mill according to claim 1, wherein the elastic mechanism comprises a rubber spring, a lower supporting pillar, and an upper supporting pillar; wherein the lower supporting pillar is fixedly arranged at a top of the base; the upper supporting pillar is fixedly arranged on a connecting plate on a side portion of the grinding cylinder; and two ends of the rubber spring respectively sleeve the lower supporting pillar and the upper supporting pillar.

7. The adjustment-facilitating vibrating mill according to claim 6, wherein the upper supporting pillar and the lower supporting pillar are in one-to-one correspondence, and a bottom of the upper supporting pillar is provided with a round hole matched with the lower supporting pillar.

8. The adjustment-facilitating vibrating mill according to claim 1, wherein a sound-proof housing is arranged on the base; and the grinding cylinder and the vibrating motor are located inside the sound-proof housing.

9. The adjustment-facilitating vibrating mill according to claim 1, wherein a protection cover is arranged on an outer side of the eccentric mechanisms; and the protection cover is mounted on the vibrating motor through a fixing screw.

* * * * *